Feb. 23, 1965   J. G. LORD   3,171,020
AUTOMATIC TOLL COLLECTION SYSTEM FOR BINARY TOKENS
Filed May 17, 1960   3 Sheets-Sheet 3
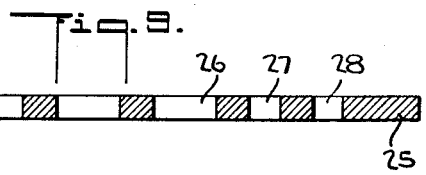
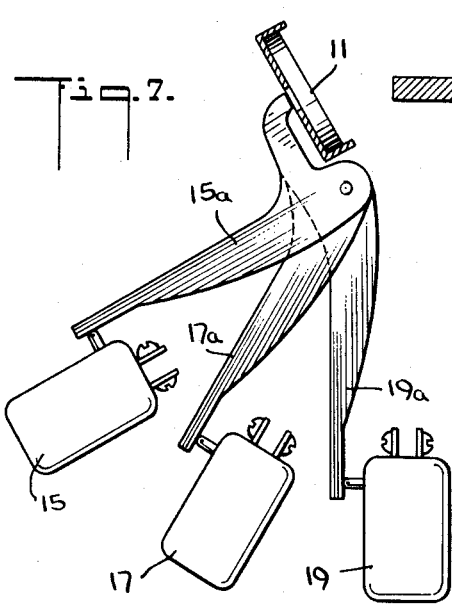
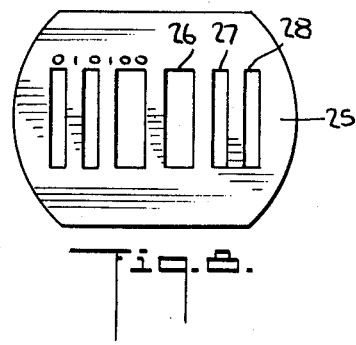
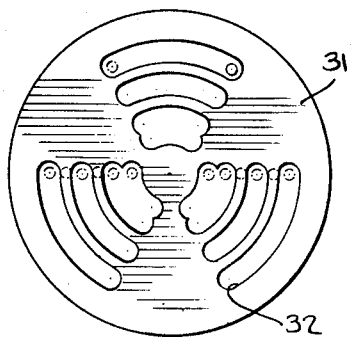
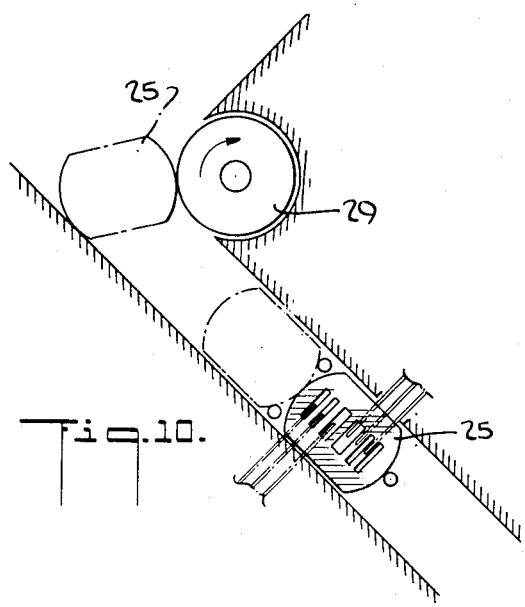
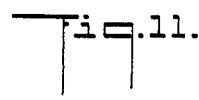
INVENTOR.
JOHN G. LORD
BY Kenyon + Kenyon
ATTORNEY

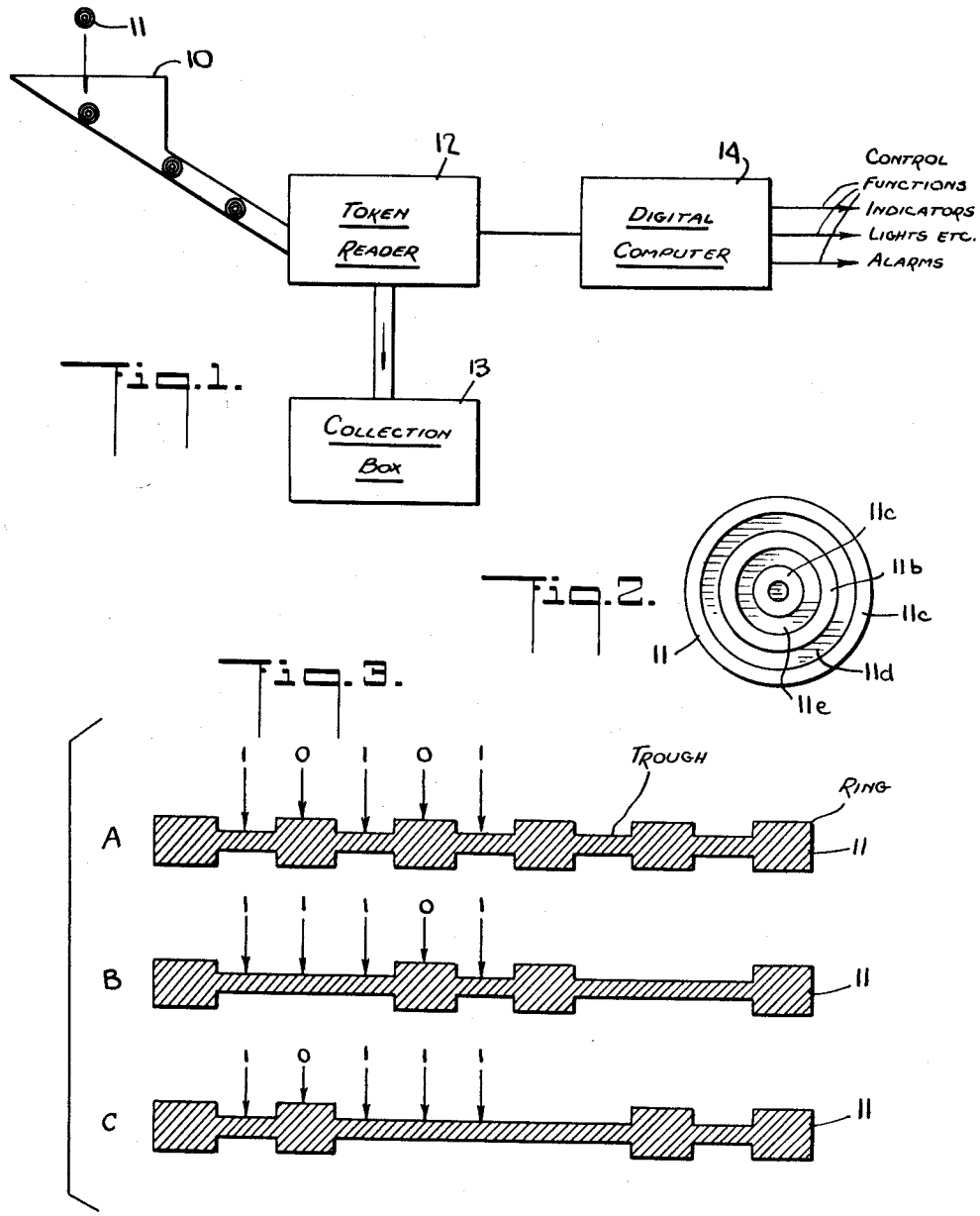

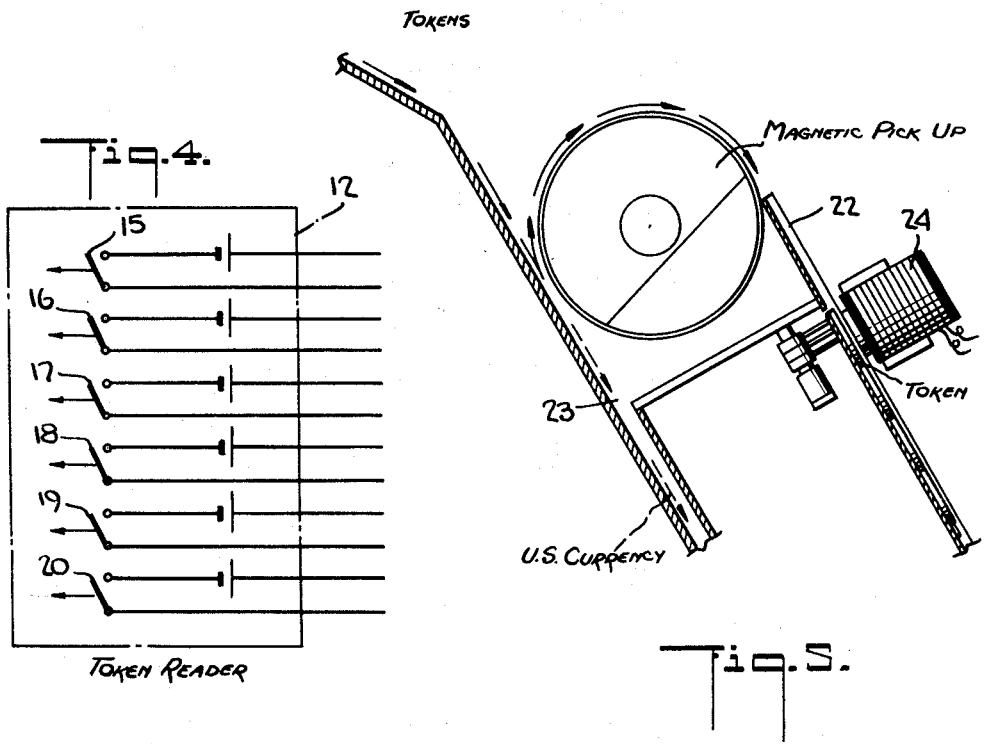
Fig. 4.
Fig. 5.
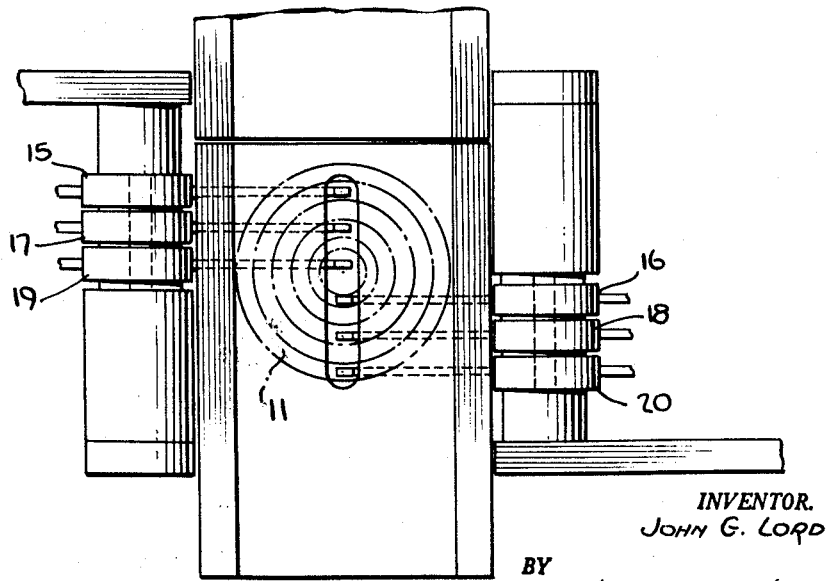
Fig. 6.
INVENTOR.
JOHN G. LORD

United States Patent Office 3,171,020
Patented Feb. 23, 1965

3,171,020
AUTOMATIC TOLL COLLECTION SYSTEM FOR BINARY TOKENS
John G. Lord, Swarthmore, Pa., assignor to Shoup Research and Development Corporation, Ridley, Pa., a corporation of Pennsylvania
Filed May 17, 1960, Ser. No. 29,689
3 Claims. (Cl. 235—61.11)

The present invention relates generally to automatic toll collection systems and more particularly to a system in which payment is made by binary tokens whose values are identified by digital computation.

In automatic toll collection systems of the type currently in use on highways and bridges, payment is ordinarily made at a toll station by dropping coins of various denominations into a hopper. The deposited coins are mechanically sorted and then counted to determine whether the full toll has been paid, in which event the paying vehicle is permitted to proceed. Assuming, for example, a toll of seventy-five cents, payment can be made by three quarters, fifteen nickels, or seven dimes and a nickel, as well as by other combinations of coins. The machine must therefore be capable of segregating the coins of different denomination by means of their respective sizes, the sorted coins then being individually counted to compute the total payment.

These sorting and counting operations must be carried out quickly and efficiently, otherwise traffic through the toll stations will be delayed until the computation is completed. While various types of mechanisms have been provided for this purpose, they are in all instances of complex and expensive design since multiple channels and associated counters must necessarily be provided for the coins of different denominations.

The problem of collection can be simplified by the use of tokens representing a predetermined value, such as 60¢ or 75¢. However, where the toll amount is different for different classes of users or changes seasonally, then it becomes necessary to use tokens which represent different values and again there arises the problem of sorting tokens on the basis of their size or other factors.

Accordingly, it is the main object of this invention to provide a token whose significance or value is indicated by binary notation, tokens representing different values, classes, or characteristics being all of the same size. If, for example, one token is to be effective for commuter purposes in the month of January and another is to be effective only in February, tokens of the same size may be used for both months.

By the use of the invention, commuters may be provided with dated or undated reduced fare tokens and a variety of rates for trucks and buses is made possible.

More specifically, it is an object of the invention to provide a binary token whose significance or value may be identified by digital computation techniques. A significant advantage of the invention is that toll collections can be effected without sorting operations. Another feature of the invention is that a single machine may be used to handle all classes of traffic, as contrasted to existing machines which are limited to a single rate of toll.

Also an object of the invention is to provide a token whose binary value may be quickly and efficiently sensed, whereby passage through a toll station may be expedited.

Briefly stated, these objects are accomplished by the use of a token having raised or depressed portions, or having apertures therein, whereby when the token is optically or mechanically sensed, the distinction between the raised and lower portions or between the solid and apertured portions afford the binary values of zero and one.

For a better understanding of the invention, as well as other objects and further features thereof, reference is made to the following detailed specification to be read in conjunction with the accompanying drawings, wherein like elements in the several views are identified by like reference numerals.

In the drawings:

FIG. 1 is a block diagram of a toll collection system involving binary tokens in accordance with the invention.

FIG. 2 shows in perspective, one embodiment of a binary token.

FIGS. 3A, 3B and 3C show in diametric section three samples of tokens having different binary values.

FIG. 4 schematically shows the sensing switches in the reader for the binary tokens.

FIG. 5 is a more detailed illustration of the token receiving and reading mechanism, shown in side view.

FIG. 6 is a plan view of the reading mechanism.

FIG. 7 illustrates the arrangement of microswitches and associated levers in the token reading mechanism.

FIG. 8 is a plan view of another embodiment of a token in accordance with the invention.

FIG. 9 is a longitudinal section taken through the token of FIG. 8.

FIG. 10 schematically shows the receiving and reading mechanism for the token of FIG. 8.

FIG. 11 is a plan view of still another binary token.

FIG. 12 is a section taken through the token of FIG. 11.

Referring now to FIG. 1, the basic automatic toll collection system in accordance with the invention comprises a hopper 10 for receiving binary tokens 11, the token being fed into a binary reader 12 which senses the value of the token to produce a binary expression. From the reader, the token drops into a suitable collection box 13. The output of the reader is fed to a digital computer 14, of any known design, to provide an output which will carry out certain control functions. For example, if the toll is 75¢ and a token of this value is placed in the hopper, then when the computer indicates the receipt of this value, it may be arranged to control traffic lights, to remove traffic barriers or perform any other operations in a toll collection system appropriate to the receipt of the correct value. In the event the received token is of the wrong date or value, then the computer will set off appropriate control functions to prevent passage of the vehicle through the toll station. These functions may be initiated by relay means or suitable electronic switches which at the conclusion of a computation are actuated in a manner depending on whether correct or incorrect payment has been made.

Before considering the nature and structure of the token, a brief review of the binary system of notation may be useful.

This mathematical system is based on Boolean algebra and makes use of a mathematical base of 2, only the numerals 0 and 1 being required to represent a number. In terms of electrical pulse notation, numeral "1" is represented by the presence of a pulse and "0" by the absence thereof.

These numerals have the same meaning as in the decimal system but a different interpretation is placed on the position occupied by the digit. In binary notation, the individual digits or bits represent the coefficient of powers of two, rather than ten. For example, the number 13 in a binary form is written as 1101. This four place binary expression may be translated in terms of coefficient of 2 as follows:

$$1101 = \frac{1 \times 2^3 + 1 \times 2^2 + 0 \times 2^1 + 1 \times 2^0}{8 \ + \ 4 \ + \ 0 \ + 1 = 13}$$

In digital computers, logical circuits are provided to carry out the required arithmetic operations. Typical circuits for digital computation are disclosed in the text "Digital Computers, Components and Circuits" by R. R. Richards by Van Nostrand Co.—1957. In binary adders the input signals to be added are in the binary form, such as 1101 for the number 13, 0110 for the number 6, etc.

One example of a binary token 11 in accordance with the invention is shown in FIG. 2 and is constituted by a metal disc having three raised concentric rings 11a, 11b and 11c formed on both faces thereof, the rings being evenly separated by annular channels 11d and 11e. The tokens are all identical in size, the value or significance of the token being indicated by the number of rings and their relative radial positions. In order to provide tokens of uniform thickness, the outer ring is never removed so that the tokens may be conveniently stacked and handled.

Use is made of the binary concept underlying digital computer operations, the significance or value of each token being read by a series of sensing microswitches 15 to 20 in the reader 12, as shown in FIG. 4. The switches are actuated by feelers or probes which engage the surface of the token along a radial path. The presence of a raised ring is detected by the probe to actuate the associated switch to produce a "1" bit, the switch being unactuated in the absence of a ring to produce an "O" bit. Each switch is connected in series with a voltage source to provide a pulse when actuated, the pulse being applied to the digital computer.

In FIGS. 3A to C there are shown various samples of tokens in accordance with the invention, FIG. 3A being the profile of the token shown in FIG. 2. It will be seen that the switches, starting from the center of the token, will produce the binary value 10101. In FIG. 3B, only two rings are provided which are so spaced as to produce from the center the binary value 10111, while in FIG. 3C the arrangement produces binary value 11101. Thus, by selective combinations of rings, the full code of binary values may be produced. The number of bits in the binary expression can, of course, be predetermined by suitable token and ring dimensions. The binary token may be coded not only to produce denominational values but to represent any other quality, characteristic or symbol necessary for total collection or for other purposes.

Referring now to FIGS. 5, 6 and 7 there is shown in greater detail the token receiving and reader mechanism. To separate the tokens dropped into hopper 10 from silver, nickel and copper coins, such as pennies, dimes, nickels, etc., the tokens are preferably made of ferrous metal such as cadmium steel. The tokens are intercepted by an unscrambling roll 21 having magnetic pick-up means, the tokens being delivered by the roll into a chute 22 and the non-ferrious coins being delivered into passage 23.

The tokens falling down chute 22 are maintained momentarily at a read-out position by a solenoid 24 or by mechanical pressure means. In practice the solenoid or its functional equivalent is de-activated at the conclusion of the computation. Thus, when the digital computer 14 completes its operation, it acts to de-energize solenoid 24 momentarily to release the measured token, the solenoid then being re-energized to hold the next token. For purposes of inspection through a suitable window in the chute, an escapement may be provided to hold the last two or three tokens after read-out.

The microswitches 15 to 20, as best seen in FIGS. 6 and 7, are divided into two groups each having three switches, one group being placed on one side of the chute and the other group being placed on the other side. The probes for sensing the appropriate positions on the token are in the form of pivoted levers 15a to 20 having tips which engage the token surface, the legs of the levers engaging the microswitch actuators. Thus, if the tip engages a ring on the token, it will swing the lever to press the microswitch actuator and thereby produce a "1" pulse but if it falls into a depression on the token the switch will remain unactuated to represent a "O."

In the system making use of the token shown in FIG. 2, reading is effected without regard to the orientation of the token. That is to say, the same reading will be afforded on either face of the token and for any diametrical position thereon. In the token 25 shown in FIGS. 8, 9 and 10, the token must be read at specific positions but it is self-orienting. The token is in the form of an oblate disc having two curved sides and two flat sides. Pierced into the disc on either side of the transverse center line are a pair of binary impressions represented by rectangular apertures 26, 27 and 28.

Thus, the token 25 may be read on either side of the center line by spring-loaded sensing probes, as previously described, the code being determined by the presence and absence of metal at the sensing points. In the example shown, the binary value, reading from the center out is 001010. This token is obviously lighter in weight than that shown in FIG. 2 and makes use of less metal.

As best seen in FIG. 10, the token may be caused to assume the proper orientation for read-out means of a spinner wheel 29 which engages only the curved surfaces of the token to cause the flat sides thereof to align themselves with the parallel walls of the channel 30. The token falling through the channel is arrested momentarily at the reader position where it is sensed by microswitch levers in the manner previously described. Because of the apertures in this token it is clearly not possible to form annular binary areas as in the case of the token in FIG. 2. However, the combination of flats and curved edges makes this token self-orienting.

The number of code permutations will of course depend on the number of sensing positions that can as a practical matter be established along the longitudinal axis of the token on either side of the transverse axis. While a six position code is shown, it will be appreciated that a greater or smaller code may be used.

In the token shown in FIGS. 11 and 12, a circular disc token 31 is shown which is not self-orienting and therefore means must be provided in the reader to establish the proper read-out position. To facilitate orientation, token 31 is provided with three identical sets of binary impressions at equi-spaced radial positions. The binary impressions are in the form of arcuate slots 32 which are pierced along concentric circles radiating from the center of the token. This token may be caused to assume the proper read-out position by means of three retractable locating pins projecting from a crown which is rotated periodically so that the pins fall into slots and turn the token to a desired angular position for sensing. The crown may be withdrawn simultaneously with the de-energization of the holding solenoid to release the token.

The binary token system, as pointed out above, makes use of a single diameter and thickness token which in practice may have 32 to 64 separately identifiable variations, with the same exterior dimensions. It is possible automatically to sort the token for reuse, accounting and packaging. By reason of the single size, packaging the tokens is simplified. The identification system permits comparatively complex toll structures covering for example dated commuter tokens (i.e. $10.00 for 40 tokens good for five weeks), undated reduced fare token (i.e. $10.00 for 25, good any time), and a variety of rates for trucks and buses (i.e. 75¢ to $1.50 depending on "axles," etc.).

While there has been shown several preferred embodiments of my invention, it is to be understood that many modifications may be made therein without departing from the essential spirit of the invention. For example, read-out may be effected by light passing through the openings in the tokens to operate photocells providing the binary pulses. It is intended therefore to cover all such

What is claimed is:

1. An automatic toll collection system comprising means to receive single size binary tokens having two sets of symmetrically disposed variations in thickness representing at a series of positions the respective binary bits of one and zero in a binary code expression, a reader coupled to said receiving means to sense the binary value of the incoming tokens, said reader including two groups of thickness responsive detectors arranged so that one of said groups responds to alternate binary bits of one of said two sets of binary codes and the other of said groups responds to the complementary alternate binary bits of the other of said two sets of binary codes, and a digital computer coupled to said reader to provide an output for effecting predetermined control functions corresponding to said output.

2. A toll collecting system including a token comprising a disc having concentric rings thereon at predetermined radial positions to provide a series of raised and depressed annular areas representing the binary bits of zero and one in a binary code expression and a reader for reading said code from said token, said reader including two groups of feelers responsive to said raised and depressed areas, one of said groups being arranged in radial relation to said token to read alternate bits of said binary code, and the other of said groups positioned remote from the first group to read the complementary alternate bits of said binary code.

3. An automatic toll collection system comprising means to receive binary tokens each constituted by an oblate disc having two diametrically opposed curved sides and two flat sides, said disc having on either side of its transverse center line like apertures providing at a series of spaced positions solid and open areas representing the bits of zero and one in a binary code expression, and a reader coupled to said receiving means to sense the binary value of the token, said reader including two groups of detectors responsive to said solid and open areas for reading said code, one of said groups arranged to respond to alternate bits of the binary code on one side of said center line and the other of said groups arranged to respond to the complementary alternate bits of the binary code on the other side of said center line.

References Cited in the file of this patent

UNITED STATES PATENTS

| | | |
|---|---|---|
| 859,033 | Ames | July 2, 1907 |
| 1,995,493 | Ardiff | Mar. 26, 1935 |
| 2,113,634 | Tauschek | Apr. 12, 1938 |
| 2,704,187 | Beach et al. | Mar. 15, 1955 |
| 2,811,308 | Baccari | Oct. 29, 1957 |
| 2,896,844 | Roth | July 28, 1959 |
| 2,954,923 | Hoffman | Oct. 4, 1960 |